Sept. 2, 1969   H. SCHMIDT   3,464,770
COMBINED SIGHTING MECHANISM AND LASER RANGE FINDER
Filed Oct. 21, 1965   2 Sheets-Sheet 1

INVENTOR
Horst Schmidt

BY *Spencer & Kaye*
ATTORNEYS

Sept. 2, 1969  H. SCHMIDT  3,464,770
COMBINED SIGHTING MECHANISM AND LASER RANGE FINDER
Filed Oct. 21, 1965  2 Sheets-Sheet 2

INVENTOR
Horst Schmidt

BY *Spencer & Kaye*

ATTORNEYS

United States Patent Office 3,464,770
Patented Sept. 2, 1969

3,464,770
COMBINED SIGHTING MECHANISM AND LASER RANGE FINDER
Horst Schmidt, Nauborn, Kreis, Wetzlar, Germany, assignor to Ernst Leitz GmbH, Optische Werke, Wetzlar, Germany
Filed Oct. 21, 1965, Ser. No. 499,346
Claims priority, application Germany, Nov. 7, 1964, L 49,230; Sept. 3, 1965, L 51,552
Int. Cl. G01c *3/08;* F41g *3/06;* G02b *23/10*
U.S. Cl. 356—4                              9 Claims

ABSTRACT OF THE DISCLOSURE

Arrangement combining a laser range finder, including transmitter and receiver, with a sighting mechanism, including an ocular, for determining the distance of a target and for adjusting the angle of elevation required to fire a projectile at the target. The laser range finder and the sighting mechanism have partially coextensive beam paths. A divider mirror in the beam path of the sighting mechanism directs received rays to the laser receiver and sighting mechanism ocular. A reticle plate arranged in front of the mirror is connected to an element of an optical system provided in front of the laser transmitter. The reticle plate and such element are displaceable transversely to the optical axis of such optical system. Means provided in the beam path to the laser receiver block the rays reflected from the target to which the laser receiver is sensitive, except for rays, which correspond to the transmitted beam in divergence and direction and which are within the visible portion of the spectrum; the former being passed to the laser receiver and the latter to the ocular of the sighting mechanism via the divider mirror. Means are also coupled between the laser receiver and the reticle plate for displacing the reticle plate and such element in response to signals from the laser receiver. By this arrangement, adjustments can be made in the elevation angle required for a projectile to reach the target.

---

The present invention relates to an arrangement wherein a visual sighting mechanism is coupled with a laser range finder and wherein the arrangement is provided with a device which adjusts for the angle of elevation required, e.g. for a weapon associated with the arrangement to fire a projectile at a target.

A device of this type is known wherein the angle of elevation for a weapon associated with the device is determined by adjusting a rotating pair of prisms provided in the beam path of both the sighting mechanism and the laser transmitter. Since the rotating prisms must receive each beam path in contradistinction to a single beam path, the diameter of the optical systems for the pair of rotating prisms and also for the associated optical components positioned in front thereof must necessarily be correspondingly larger. It has therefore been suggested that this disadvantage may be overcome by directing the beam of rays of the laser transmitter within the region of the beam path of the sighting mechanism. However, this is impossible without limiting the field of a portion of the beam required for the visual sighting device. Aside therefrom, the use of a rotating prism pair represents a substantial increase in the cost of the device because the prisms, of necessity, must be made of a complicated construction in order that the prisms have good optical and mechanical properties.

Another disadvantage of the prior arrangements is that when the mechanism is incorporated into armored vehicles, it is particularly difficult to provide a gear connection between the adjusting device in the interior of the vehicle and the rotating prisms located on the outside of the vehicle.

Additionally, there is a further disadvantage in that rotating prisms generally produce astigmatic distortions and secondary chromatic aberrations. Furthermore, the components can not be cemented together because of the intense laser radiation and the resulting glass-air areas cause disturbing reflections.

It is an object of the present invention to provide an arrangement of a sighting mechanism coupled with a laser range finder which is of simple construction and economical to produce.

It is another object of the present invention to provide a combined sighting mechanism and laser range finder having a common optical system for a portion of the beam paths.

It is a further object to provide a combined sighting mechanism and laser range finder having an optical system which is relatively free of distortions.

In accordance with the present invention, the aforedescribed disadvantages of the prior arrangements are overcome by providing in front of a chromatic divider mirror mounted in a conventional manner in the beam path of a sighting mechanism, a reticle plate, and connecting the plate with an element of the optical system arranged in front of a laser transmitter, with the plate being mounted for displacement transverse to the optical axis. There is further provided in the beam path of a laser receiver, optical means which block the rays to which the laser receiver is sensitive, except for the rays which are reflected from the target and correspond to the transmitted beam in divergence and direction and for the rays within the visible portion of the spectrum which are fed to the ocular of the sighting mechanism via the divider mirror.

According to a feature of the invention, the blocking may be accomplished by providing a coating on the reticle plate, except for a small central surface portion, for blocking the rays lying beyond the visible portion of the spectrum to which the laser receiver is sensitive. Thus the coating forms a diaphragm for limiting the beam of rays used for measuring and which is united with the reticle plate.

Although the arrangement including a coating as a diaphragm for blocking the rays is more economical than prior arrangements, the coating increases the expense of the arrangement. Therefore, according to another feature of the invention, the diaphragm is separated from the reticle plate and is mounted in a plane that is optically related to the plane of the reticle plate. There is further provided means which ensure that the received rays that are used for measuring and which are parallel to the transmitted rays always enter through the center of the diaphragm regardless of the position of the reticle plate. The diaphragm may be adjusted to correspond to the different positions of the reticle plate by means of a complicated gear arrangement. However, the present invention provides a simplified arrangement wherein a two-member optical system having a parallel beam path between the two-members is arranged in front of the fixed diaphragm of the laser receiver. The reticle plate image is then produced in the diaphragm plane, and the member of the system which is adjacent the reticle plate is connected to the reticle plate and is displaceable with the plate in a plane transverse to the optical axis. The beam divider is suitably arranged between the reticle plate and the member of the two-member system which is arranged in front of the laser receiver.

According to a further feature of the present invention, there is provided a pancratic or zoom lens telescopic sight as the sighting mechanism, wherein the sight may be used with the laser range finder or as an auxiliary system in place of the laser range finder.

Additional objects and advantages of the present invention will become apparent upon consideration of the following description when taken in conjunction with the accompanying drawings in which.

Figure 1:
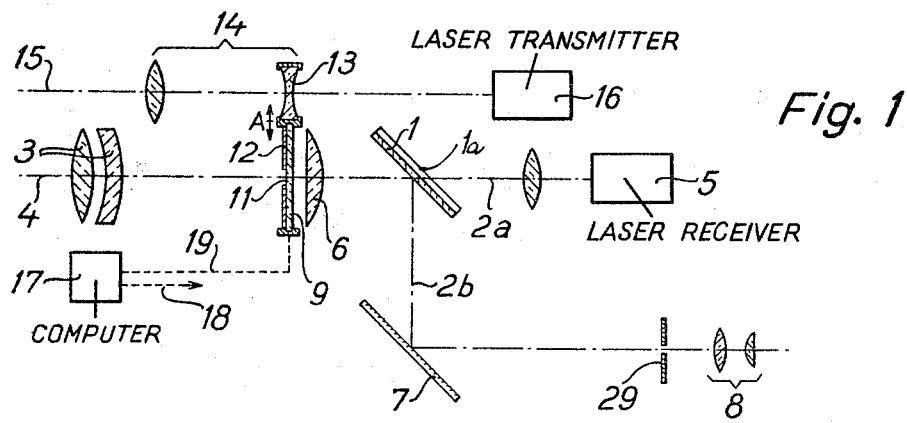
FIGURE 1 is a schematic view of the combined sighting and laser beam measuring device having the reticle plate coupled with the device for blocking rays.
Figure 2:
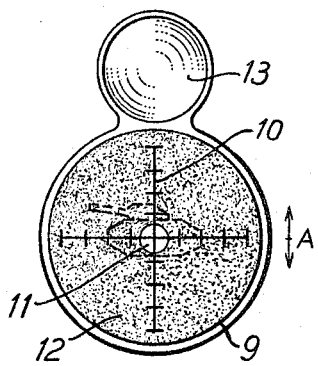
FIGURE 2 is a front view of the recticle plate of FIGURE 1 with a target indicated thereon in dash-dot lines.

Referring now to the drawings, there is shown in FIGURE 1 a reticle plate 9 arranged in front of a chromatic divider or semi-reflecting mirror 1 which directs a portion 2a of the rays 4 coming from an objective 3 of the sighting mechanism to a laser receiver 5 and reflects a portion 2b via a field lens 6 and a mirror 7 to an ocular 8 with the field of view plane 29 being arranged in the ocular image plane. As can be seen, a plane parallel plate 1a supports the mirror 1. As shown in FIGURE 2, the reticle plate 9 which is fully permeable for the visible portion of the spectrum carries the line configuration 10 and is provided, outside of the central portion 11, with a coating 12 which is impermeable to laser rays, the size of the central portion 11 being determined by the scattering angle of the laser transmitter and by the focal length of the optical system of the sighting mechanism provided in front of the reticle plate. The coating may be of any suitable type such as a reflective coating effective only for laser rays. The reticle plate is connected with the negative optical member 13 of a two optical member Galilean system 14 and is displaceable with the member 13 in the direction of arrow A transverse to the optical axis of the two member optical system.

The Galilean system has an axis 15 which extends in parallel with the center line of the objectives 3 and is arranged in front of a laser transmitter 16, whereby the negative member 13 which is connected to the reticle plate causes a deflection of the transmitted laser rays. The displacement of the negative element has the same optical effect as the displacement of the reticle plate. The displacement can be done in two coordinates at right angles to the optical axis of the laser transmitter and at right angles to the optical axis of the optical system provided in front of the divider mirror, respectively, i.e., in a plane transverse to the optical axis. A computer 17 is connected via a cable 18, with the laser beam measuring device and transmits its commands to the reticle plate 9 via the connection 19. The mechanical means for adjusting the sighting mechanism are not illustrated in the drawing.

Figure 3:
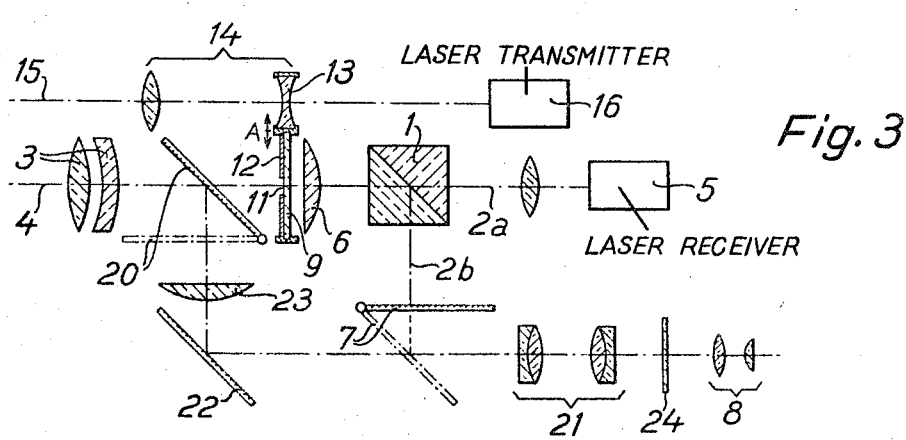
FIGURE 3 is a schematic view of another embodiment of the present invention having a pancratic telescope sight and a deflection device.

The mode of operation of the arrangement shown in FIGURE 1 is essentially as follows: At first, the sighting procedure is carried out in the conventional manner through use of the visual sighting mechanism with the entire system including a weapon coupled thereto, being set on the target with respect to height and direction. Thereafter, the range finding process is carried out by means of the leaser beam device. In this process, the rays 15 emitted by the laser transmitter 16 are received by the objective 3 after reflection at the target and pass through the central aperture 11 of the reticle plate 9 to the divider mirror 1 and to the receiver 5. The sighting mechanism is provided with conventional protective devices which are actuated during the laser range finding. The divider mirror may be supported by a plane parallel plate or, as shown in FIGURE 3, a prismatic cube. The reflective coating 12 prevents undesired rays from passing through the reticle plate for these would otherwise impair the measuring result.

The laser beam range finding process is similar to a radar distance measuring process in that the time interval between the emission and reception of the transmitted beam is an indication of the distance of the target. The distance information is then fed to the computer 17, together with other values such as wind speed and direction, target speed, etc. The computer processes this data and determines the elevation and lead angle for the target and transmits the result to the plate 9 via the connection 19. The reticle plate 9 and the lens 13 are then shifted in accordance with the computer calculation to compensate for the elevation angle necessary for a projectile to reach the target. However, the shifting of the plate and the lens 13 results in the target no longer being centered in the cross-hairs 10 of the plate 9 since the line of sight is no longer directed at the target and therefore the entire sighting arrangement and the weapon coupled thereto are shifted to again center the target. The movement of the weapon and the sighting arrangement thereby provide the required elevation angle necessary for a projectile to reach the target. The laser beam range finding process may then be repeated to check the target range without having to return the entire arrangement to a basic setting. However, any further changes causing a further shifting of the reticle plate will also have to be compensated for by a corresponding movement of the entire apparatus.

In FIGURE 3, which is another embodiment according to the present invention, there is shown a movable mirror 20 provided behind the objective 3; whereby in case of inoperativeness or non-use of the laser device, the received rays are directed to a pancratic or zoom lens range finder 21 combined with the sighting mechanism. For this purpose, a further deflection mirror 22 and an additional field lens 23 are provided in the beam path. Furthermore, the mirror 7 in this embodiment must be collapsible, i.e., capable of being swung out of the axis of the pancratic system. The deflection system also includes a range finding mark 24, arranged in the ocular 8.

In the arrangement of FIGURE 3, the range finding procedure can be carried out by means of the pancratic system 21 in case the laser device is inoperative, or as a supplement to the laser measuring process. However, in order to use the pancratic system for range finding, the mirrors 20 and 7 must be moved into the position shown in solid line in FIGURE 3. This range finding is then accomplished by changing the enlargement scale of the pancratic system until the target configuration on the range finding mark 24 is adjusted to the size of the target so that the mark is rendered congruent with the target. The adjustment path for changing the magnification which is an indication of the range, can then be used to set the elevation angle of the weapon or the movement of the lens system can be transferred to the reticle plate 9 via means which are not illustrated, and the elevation of the weapon carried out as discussed in connection with FIGURE 1.

Thus, the zoom lens system may be used with the laser arrangement as a complementary system, or as an auxiliary system in place of the laser arrangement for the purpose of range finding.

Furthermore, it is also possible to obtain an auxiliary range finding without using a pancratic optic by providing in the ray path of the visual sighting mechanism a conventional range finder comprising two mutually displaceable sections. In this conventional arrangement, as well as in the arrangement using a pancratic system, the range finding mark is positioned in the image plane of an intermediate image producing system included in the auxiliary system. In order that only this measuring mark be visible in the field of vision, it is advantageous to circumvent the index plate located in a different image plane by means of a mirror arrangement similar to that of FIGURE 3. However, if the range finding marks are advantageously arranged, for example in such a manner that they do not overlap one another, the feature of eliminating the reticle plate by deflection mirrors can be omitted.

Figure 4:
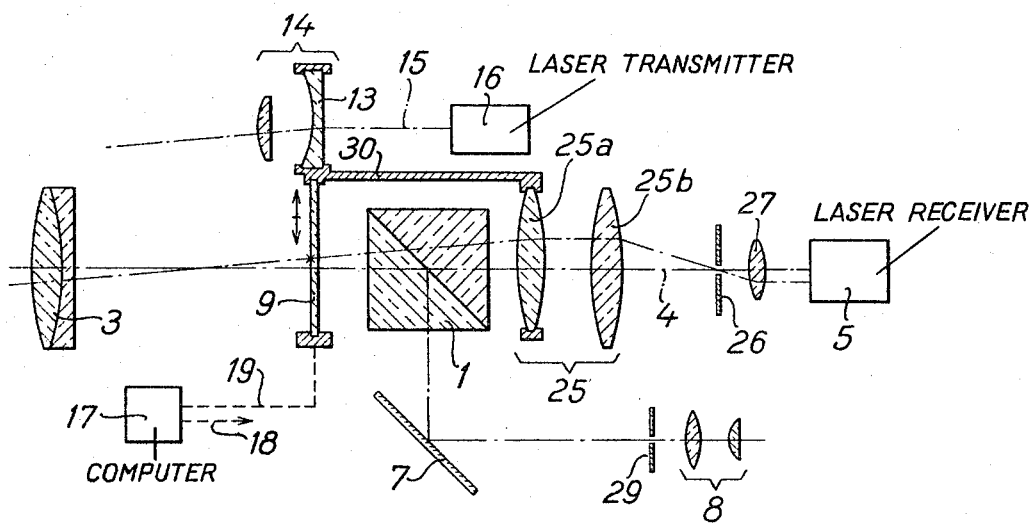
FIGURE 4 is a further embodiment of a combined sighting and laser beam measuring device according to the present invention having a reticle plate and a diaphragm that are arranged in different planes.

In the arrangement shown in FIGURE 4, which is a further embodiment of the present invention, there is provided a further two-member optical system comprising lens 25a and lens 25b, a diaphragm 26 and a lens 27 arranged in front of the laser receiver 5. Reflected rays are directed to the beam divided mirror via the objective 3 arranged in the optical axis 4 of the laser receiver, after passing through the reticle plate 9. The beam divider 1 splits the received rays so that a portion of the rays is fed to the ocular 8 of the sighting device via the deflection mirror 7 and the other portion passes through the beam divider to the laser receiver via the two member system 25, the diaphragm 26 and the lens 27, with diaphragm 26 corresponding to the coating 12 as shown in FIGURE 1 for limiting the beam of rays used for measuring the range.

The reticle plate 9 is arranged in the front focal plane of the lens 25a and the diaphragm 26 in the back focal plane of the lens 25b of the system 25 which is constructed to provide collimated rays between the two lens members, whereby the image of the reticle plate is produced in the diaphragm plane. The lens 25a is fixedly connected with the reticle plate 9 through a connecting member 30 and together with the plate is displaceable in a plane transverse to the optical axis of the system. The negative member 13 of the Galilean system 14, which is arranged in the beam path 15 of the laser transmitter 16, is also coupled with the reticle plate and is displaceable therewith. The reticle plate 9 is controlled via the cable 19 from the computer 17 which evaluates the measuring results fed to it from the laser beam range finder via cable 18.

The mode of operation of the device shown in FIGURE 4 is as follows: As in the operation of the arrangement of FIGURE 1, the range finding process is first performed in a conventional manner by using the sighting device, whereby the entire arrangement including the coupled weapons is set on the target in height and direction. The target line of the telescope, the transmitted laser beam, the received laser beam and the bore axis of the weapons are then arranged parallel to each other. The measuring of the range is then performed by means of the laser range finding device. The rays 15 transmitted by the transmitter 16 are in a conventional way received by the objective 3 after having been reflected by the target and then reach the chromatic divided mirror 1 after having entered through the reticle plate 9. The divided mirror separate the visible portion of the rays and directs that portion to the ocular 8 of the sighting device with the laser beams being passed to receiver 5 via the system 25 and the lens 27. The results of the receiver are fed to the computer 17 for calculation of the angle of lead and elevation which is then transferred to the reticle plate 9 by displacing the same.

The displacement of the negative member 13 and the lens 25a with the reticle plate results in the target line of the telescope as well as the transmitted and received laser beam being maintained parallel to each other, but forming as desired, an angle relative to the weapon coupled therewith. The shifting of the reticle plate 9 and the sight line toward the target is then compensated for by counter-steering the entire sighting arrangement and the weapons, thereby providing the elevation angle required for a projectile to reach the target.

The operation of the present embodiment is dependent upon the displacement of the lens 25a with the reticle plate. Due to the afore-described construction of the system 25, it is provided that in any angular position existing between the transmitted beams and the bore axis of the weapons coupled to the sighting arrangement only those received rays that enter parallel to the transmitted rays are directed in the desired way through the center of the diaphragm 26 to the laser receiver 5 for a true determination of the range.

Thus, it is seen from the afore-described embodiments that the present invention provides arrangements including laser beam range finders which directly adjust for the angle of elevation by movement of the reticle plate. These arrangements are economical to produce and are relatively free of distortion since the need for additional optical components of complicated structure is eliminated. As shown, the present invention also provides means for limiting the rays passed to the laser receiver, such as the coating on the reticle plate and the separate diaphragm in a different plane from that of the reticle plate, in order to provide a true measurement of the target range.

It will be understood that the above description of the present invention is susceptible to various modifications, changes, and adaptations.

What is claimed is:

1. A combined sighting mechanism and laser range finder arrangement for determining the distance of a target from the arrangement and for adjusting for the angle of elevation required for a weapon associated with the arrangement to fire a projectile at the target, the arrangement comprising, in combination:

a laser range finder including a laser transmitter for transmitting laser rays to a target along a beam path and a laser receiver for receiving reflected rays from the target along a beam path;

a sighting mechanism optical system having a beam path and including an ocular, said beam path of the sighting mechanism optical system and said beam path of the laser receiver being at least partially coextensive;

a divider mirror mounted in the beam path of said laser receiver for transmitting received rays from the target to said laser receiver and for reflecting received rays from the target for direction to said ocular of said sighting mechanism optical system;

a two-member optical system arranged in the beam path of said laser transmitter;

a reticle plate mounted in front of said divider mirror in the beam path of the laser receiver and the sighting mechanism optical system and coupled to one member of said two-member optical system for displacement in a plane transverse to the optical axis of such two-member optical system, such displacement adjusting the elevation angle required for a projectile to reach the target;

means for passing to said laser receiver that portion of the rays reflected from the target which correspond in direction and divergence to the transmitted rays and to which said laser receiver is responsive, and for passing to said ocular of the sighting mechanism optical system that portion of the rays reflected from the target which fall within the visible spectrum by way of said mirror, and for blocking the other rays to which said laser receiver is responsive; and means coupled between the laser receiver and the reticle plate and responsive to signals from said laser receiver for displacing the reticle plate and said one member of the two-member optical system in said transverse plane thereby to adjust for the elevation angle required for a projectile to reach the target.

2. An arrangement as defined in claim 1 wherein said reticle plate is fully permeable for the visible portion of the spectrum and said means for passing and for blocking the rays is a coating impermeable to laser rays provided on said reticle plate having a small open portion of a predetermined size at the center of said reticle plate for passing the rays to which the laser receiver is responsive, the size of said open portion being determined by the scattering angle of said laser transmitter and by the focal length of the optical system of said sighting mechanism.

3. An arrangement as defined in claim 2 wherein the coating provided on said reticle plate outside of the central open portion reflects rays to which the laser receiver is responsive.

4. An arrangement as defined in claim 1 wherein said two member optical system is a Galilean system, said member connected with said reticle plate being the negative lens thereof.

5. An arrangement as defined in claim 1 wherein said sighting mechanism is a pancratic telescopic sight.

6. An arrangement as defined in claim 5 wherein said pancratic telescopic sight is provided with a range finding mark for auxiliary range finding in addition to the laser range finder.

7. An arrangement as defined in claim 6 wherein said pancratic telescopic sight includes an image-reproducing system and said range finding mark is provided in the image plane of said system.

8. An arrangement as defined in claim 1 wherein said divider mirror is a chromatic mirror and a plane parallel plate supports said mirror.

9. A combined sighting mechanism and laser range finder arrangement for determining the distance of a target from the arrangement and for adjusting for the angle of elevation required for a weapon associated with the arrangement to fire a projectile at the target, the arrangement comprising, in combination:
- a laser range finder including a laser transmitter for transmitting laser rays to a target along a beam path and a laser receiver for receiving reflected rays from the target along a beam path;
- a sighting mechanism optical system having a beam path and including an ocular, said beam path of the sighting mechanism optical system and said beam path of the laser receiver being at least partially coextensive;
- a divider mirror mounted in the beam path of said laser receiver for transmitting received rays from the target to said laser receiver and for reflecting received rays from the target for direction to said ocular of said sighting mechanism optical system;
- a two-member optical system arranged in the beam path of said laser transmitter;
- a reticle plate mounted in front of said divider mirror in the beam path of the laser receiver and the sighting mechanism optical system and coupled to one member of said two-member optical system for displacement in a plane transverse to the optical axis of such two-member optical system, such displacement adjusting the elevation angle required for a projectile to reach the target;
- means for passing to said laser receiver that portion of the rays reflected from the target which correspond in direction and divergence to the transmitted rays and to which said laser receiver is responsive, and for blocking the other rays to which said laser receiver is responsive, said means for passing and for blocking the rays being a fixed diaphragm mounted in front of said laser receiver;
- means coupled between the laser receiver and the reticle plate and responsive to signals from said laser receiver for displacing the reticle plate and said one member of the two-member optical system in said transverse plane thereby to adjust for the elevation angle required for a projectile to reach the target; and
- a further two-member optical system arranged in front of said fixed diaphragm, one member of said further two-member optical system being adjacent to said reticle plate and connected therewith for displacement transverse to the optical axis of a portion of the sighting mechanism optical system, said further two-member optical system providing a parallel beam path therebetween and producing the image of said reticle plate in the diaphragm plane.

References Cited

UNITED STATES PATENTS 3,339,457  9/1967  Pun.

RONALD L. WILBERT, Primary Examiner

F. L. EVANS, Assistant Examiner

U.S. Cl. X.R.

356—252